United States Patent [19]

Lee et al.

[11] Patent Number: 5,008,918

[45] Date of Patent: Apr. 16, 1991

[54] BONDING MATERIALS AND PROCESS FOR ANODE TARGET IN AN X-RAY TUBE

[75] Inventors: David S. Lee, Brookfield; Thomas C. Tiearney, Jr., Waukesha, both of Wis.

[73] Assignee: General Electric Company, Milwaukee, Wis.

[21] Appl. No.: 434,159

[22] Filed: Nov. 13, 1989

[51] Int. Cl.[5] ........................ H01J 35/10; B23K 31/02

[52] U.S. Cl. .................................... 378/144; 378/143; 378/125; 228/120

[58] Field of Search ........................ 313/311; 228/120; 378/143, 144, 125

[56] References Cited

U.S. PATENT DOCUMENTS

| | | | |
|---|---|---|---|
| H547 | 11/1988 | Lux et al. | 378/144 |
| 4,145,632 | 3/1979 | Devine, Jr. | 313/330 |
| 4,298,816 | 11/1981 | Hirsch et al. | 378/144 |
| 4,320,323 | 3/1982 | Magendans et al. | 378/144 |
| 4,597,095 | 6/1986 | Akpan | 378/144 |
| 4,777,643 | 10/1988 | Devine, Jr. | 378/144 |
| 4,802,196 | 1/1989 | Tiearney, Jr. et al. | 378/143 |

*Primary Examiner*—Edward P. Westin
*Assistant Examiner*—Kim-Kwok Chu
*Attorney, Agent, or Firm*—Quarles & Brady

[57] ABSTRACT

A composite target for an x-ray tube has a graphite substrate portion and a metal portion, the two portions being bonded together by platinum and platinum alloying materials. The preferred alloying materials are tungsten and nickel which act in conjunction with the platinum to improve the bond resulting in an x-ray tube having a longer life span.

10 Claims, 1 Drawing Sheet

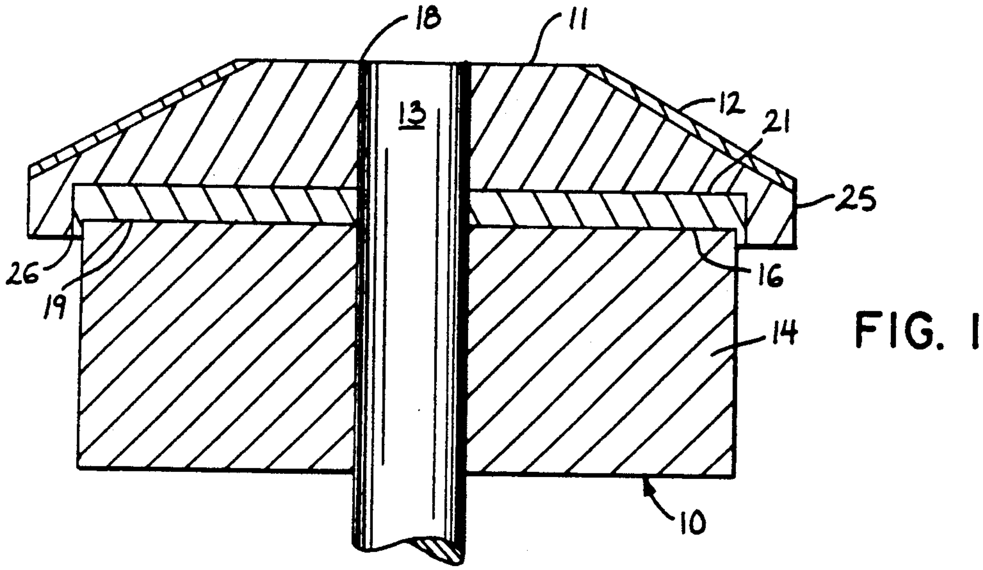
FIG. 1
FIG. 2
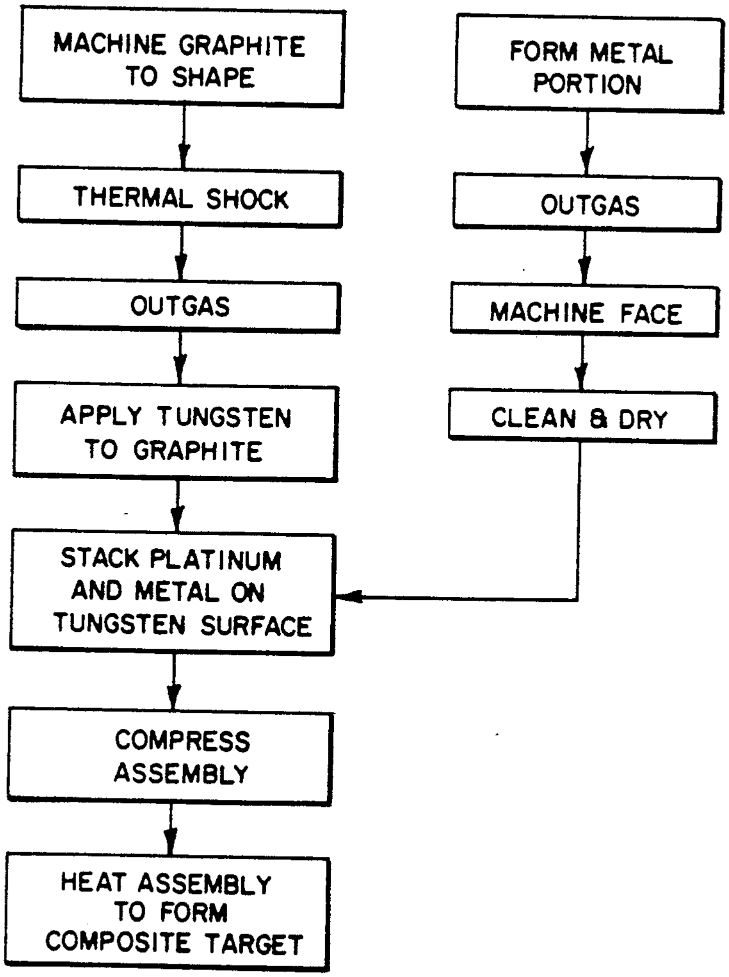

BONDING MATERIALS AND PROCESS FOR ANODE TARGET IN AN X-RAY TUBE

BACKGROUND OF THE INVENTION

This invention relates generally to x-ray tube anode targets and, more particularly to bonded structures for x-ray tube rotating anode targets.

With increased demands being placed on the performance of x-ray tubes, manufacturers have looked for ways to increase the efficiency and/or enhance the longevity of the x-ray tube target. One approach has been to substitute a graphite material for the conventional refractory metal, such as molybdenum, used in the target body. Graphite offers the advantages of both significantly higher heat storage capacity and lower density. The increased heat storage capacity allows for sustained operation at higher temperatures, whereas the lower density allows for the use of bigger targets with less mechanical stress on the bearing materials.

Along with the advantages of the graphite targets as discussed above, there are certain problems to overcome when one chooses that material over the commonly used refractory metal. First, it is more difficult to attach the graphite body to the rotatable stem of the x-ray tube than it is to attach a metal disc. Secondly, when a focal track is applied directly to a graphite substrate, the rate of heat transfer from the focal track to the substrate is slower than when the focal track is attached to a metal substrate. Under certain operating conditions, this can cause an overheating of the focal track and resultant damage to the target.

A known approach for obtaining the advantages of each of the commonly used materials, i.e. refractory metal and graphite, is to use a combination of the two in a so-called composite substrate structure. This structure is commonly characterized by the use of a refractory metal disc which is attached to the stem and which has affixed to its front side an annular focal track. Attached to its rear side, in concentric relationship to the stem, is a graphite disc which is, in effect, piggybacked to the refractory metal disc. Such a combination provides for (a) an easy attachment of the metal disc to the stem, (b) a satisfactory heat flow path from the focal track to the metal disc and then to the graphite disc, and (c) the increased heat storage capacity along with the low density characteristics of the graphite disc.

In a composite target structure, the metal portion is generally formed of a molybdenum alloy commonly known as TZM. While TZM is the preferred material in this application, MT104 can be substituted for TZM. This alloy, in addition to molybdenum, contains about 0.5% titanium, 0.07% zirconium and 0.015% carbon. Other metals, including unalloyed molybdenum can and have been used.

With a composite target, one of the main concerns is that of attaching the graphite portion to the refractory metal portion in a satisfactory manner. In addition to the obvious strength requirements, which are substantial when considering rotational speeds of up to 10,000 RPM, relatively high operating temperatures on the order of 1,200° C. and resultant high thermal stresses must also be accommodated. In addition, the metal and graphite elements must be adequately joined so as to provide for the maximum transfer of heat from the metal portion to the graphite portion. For example, it has been found that if there are voids between the two portions, the heat transfer characteristics will be inadequate in those sections.

A common method for joining the graphite portion to the metal portion is that of furnace or induction brazing with the use of an intermediate metal. Zirconium has been commonly used for that purpose because of its excellent flow and wetting characteristics. A problem that arises with the use of zirconium, however, is the formation of carbides at the interface between the zirconium and the graphite. Since the carbides tend to embrittle the joint, the strength of a joint is inversely related to both the thickness of carbide formed and the continuity of the carbide layer. The amount of the carbide formed depends on the thermal history of the component during both the manufacturing and the operational phases thereof, neither of which can be adequately controlled so as to ensure that the undesirable carbides are not formed.

Other materials have been found useful in attaching the graphite portion to the metal portion of the target. A group of such materials that has been particularly suitable for such an attachment are those discussed in U.S. Pat. No. 4,145,632, issued on Mar. 20, 1979 and assigned to the assignee of the present invention. Those materials, and platinum in particular, were found to have a significant advantage over the zirconium material because of their relative insusceptibility to forming a carbide at the graphite platinum interface.

While the techniques and materials disclosed in U.S. Pat. No. 4,145,632 represented a substantial improvement in the art of bonding composite x-ray targets, it has been found that those techniques and materials will still produce a small percentage of unacceptable bonds. It is believed that some of these bond failures are caused at the interface between the braze material and the graphite. For example, voids are sometimes found in this area.

An improved x-ray tube target is disclosed in U.S. Pat. No. 4,802,196, issued on Jan. 31, 1989 and assigned to the assignee of the present invention. While the improved x-ray tube target disclosed in U.S. Pat. No. 4,802,196, overcomes the bond failures in U.S. Pat. No. 4,145,632, there is still a need to improve the braze or bond strength between the refractory metal and the graphite portions of the x-ray tube target.

It is, therefore, an object of the present invention to provide an improved composite x-ray target with a brazed interconnection having improved bond strength and heat transfer characteristics.

Another object of the present invention is to provide a method of brazing composite x-ray tube targets which affords an alloying of platinum in the brazed material and graphite interface and, thus, maximizes bond strength and heat transfer within the target.

These objects and other features and advantages will become more readily apparent upon reference to the following description when taken in conjunction with the appended drawings.

SUMMARY OF THE INVENTION

Briefly, in accordance with one aspect of the present invention, a relatively thin layer of a bonding material, preferably tungsten, is applied to the formed graphite portion. A disc of platinum is then applied to the tungsten and the refractory metal portion placed over the platinum disc. The combination is thereafter heated to cause a brazing together of the materials. In this process, the platinum becomes the primary bonding material, while the thin layer of tungsten functions as an additional bonding agent.

The bonding agent's function generally is to improve the bond strength of the platinum as well as to serve as a wetting agent for the liquid platinum on the graphite. It has also been found that nickel can be used as well as tungsten for the foregoing purpose.

According to various aspects of the invention, the tungsten or nickel can be physical vapor deposited, chemical vapor deposited, plasma sprayed, spray painted in the form of tungsten or nickel hydride or even silk screened in the form of a tungsten, nickel, platinum-tungsten or platinum-nickel slurry. The tungsten or nickel can also be applied as a platinum-tungsten or platinum-nickel alloy foil. Generally, the tungsten should be in a layer with a thickness in the range of 6,000 to 20,000 angstroms and, preferably, the nickel should be in a layer with a thickness in the range of 40,000 to 70,000 angstroms. The layer should be thin enough that the platinum will not reach its solubility limit of tungsten or nickel during the braze, and the above-identified ranges will meet this requirement.

In the drawings as hereinafter described, preferred embodiments are depicted. However, various other modifications and alternate constructions can be made thereto without departing from the true spirit and scope of the invention.

BRIEF DESCRIPTION OF THE DRAWINGS

FIG. 1 is a sectional view of an x-ray target made in accordance with the invention; and FIG. 2 is a flow diagram showing the process of target fabrication in accordance with the preferred embodiment of the invention.

DESCRIPTION OF THE PREFERRED EMBODIMENT

Referring now to FIG. 1, there is shown a target, or anode assembly generally 10, for use as a rotating anode x-ray tube in accordance with the invention. The assembly 10 includes a metal disc portion 11 having a focal track 12 applied to a forward face thereof for producing x-rays when bombarded by the electrons from a cathode in a conventional manner. The disc 11 is composed of a suitable refractory metal such as molybdenum or molybdenum alloy such as TZM or MT104. The conventional focal track 12 disposed thereon is composed of a tungsten or a tungsten/rhenium alloy material. The disc 11 is attached to a stem 13 by a conventional method, such as by brazing, diffusion bonding, or mechanical attachment.

Attached to a rear face of the metal disc 11 is a graphite disc portion 14, the attachment being made by platinum braze, indicated generally at 16, in a manner to be described hereafter. The primary purpose of the graphite disc 14 is to provide a heat sink for the heat which is transferred through the metal disc 11 from the focal track 12. It is best if the heat-sink function can be provided without contributing significantly to the mass of the target assembly.

Referring to the braze 16, it is shown in FIG. 1 as consisting of a single layer 16 of pure platinum and tungsten. In practice, with the thicknesses specified below, the braze layer 16 will be approximately uniform in composition and consist of a single layer 16 of platinum having nearly uniformly dissolved tungsten therein.

Experiments have shown that certain materials, including tungsten and nickel, when applied in thin layers to graphite, will serve as a bonding agent with the platinum and provide an improved bonding of the platinum to the refractory portion 11 and the graphite portion 14. An additional benefit is that the tungsten and nickel will act as a wetting agent for the platinum on the graphite. It is believed that niobium, iron, chromium, cobalt, molybdenum, vanadium, and titanium will also work.

It is preferred that the bonding agent be applied to the graphite in a layer thin enough that the solubility limit of the bonding agent in platinum not be reached during the braze so that no significant amount of intermetallic phase is formed. It is best, however, if the layer is thick enough to ensure complete coverage of all surface features on the graphite.

Tests have shown that what carbide is formed prior to braze is generally dissolved in the platinum during the braze and thus is not a problem.

Generally, the bonding agent should be applied in a layer between 6,000 and 20,000 angstroms of thickness when tungsten is the bonding agent and 40,000 and 70,000 angstroms when the bonding agent is nickel.

A method for fabricating the target assembly is described in FIG. 2. For purposes of discussion, it is assumed that the metal disc portion 11 and graphite disc portion 14 have been formed by conventional methods with the disc portion 11 having a central bore 18 for receiving in close-fit relationship the stem 13 of the x-ray tube.

The graphite portion 14 is first cleaned, with particular care being given to the flat surface 19 to which the flat surface 21 of the metal portion 11 is to be attached. The surfaces of the graphite portion 14 are preferably treated by ultrasonic cleaning or other suitable surface treatment processes to prevent the release of graphite particles (dusting) during operation of the tube.

After the graphite 14 has been machined, it is processed further by thermal shocking. Thermal shock is performed by heating the graphite in air to a temperature of about 250° C. to 300° C. and then quickly submerging the heated graphite in de-ionized water at room temperature. After thermal shocking, the graphite is outgassed by heating to the elevated temperature of 1900° C. for about one hour in vacuum. The processed graphite is then ready for application of the bonding agent and brazing to a metal element.

The metal portion of the anode target is preferably formed of TZM or MT104. Some of the same steps applied to the graphite element are also applied to TZM or MT104 metal element. In particular, the TZM is vacuum fired to 1700° C. for about one hour for outgassing. After outgassing, the TZM face which is to be attached to the graphite surface is finish machined to true up the flatness of the surface since outgassing at the elevated temperature may cause the metal to warp. After machining, the TZM metal element is cleaned, typically by using an ultrasonic methanol bath. If necessary, the surface to be bonded may also be shot peened. After drying from the ultrasonic cleaning, the TZM or MT104 metal element is then ready to be bonded to the graphite element.

A preferred method of preparing the graphite is Physical Vapor Deposition (PVD) of the tungsten or nickel onto the surface 19. Portions of the surface not to be coated with the tungsten or nickel can be masked in a conventional manner. The parameters for the PVD process are as follows:

Ion Current Density - 3 to 4 watts per $cm^2$ is preferred but 1 to 4 watts is acceptable.

The tungsten or nickel purity is preferred to be at least 99.95 percent.

The pressure in the PVD vessel is preferred to be between 3 and 10 microns of argon, but the range ½ to 20 microns of argon is acceptable.

The target voltage is preferred to be in the range of 2 to 2½ kv, but can be in the range of 1 to 3 kv.

While PVD techniques are preferred, the bonding agent can also be applied using a silk screen slurry technique, plasma spraying techniques, chemical vapor deposition or tungsten or nickel hydride spray paint. In the instance where silk screening is employed, platinum and tungsten powders would be combined in an amount of 90% by weight of platinum to 10% by weight of tungsten. A slurry would be composed by mixing with a suitable silk screening vehicle. Alternatively, an alloy foil of platinum and tungsten could be used with the previously designated amounts of platinum and tungsten.

After the bonding agent is applied, a composite assembly is formed by placing a washer or foil layer of platinum between the exposed bonding agent layer and the metal portion. The preferred platinum layer is in a thickness of 250,000 to 750,000 angstroms and brazed at a minimum temperature of 75° C. above the eutectic temperature of the platinum carbon system. Preferably, several assemblies 10, typically three or four, may be formed concurrently by stacking one on top of the other.

After stacking in this fashion, a weight, preferably about 16 pounds, is placed on top of the stacked assemblies 10, and the stacked structure is placed into a vacuum chamber furnace. The furnace is typically pulled to a vacuum of about $10^{-5}$ torr. The first step in the process is to heat the furnace to a prebraze soak temperature followed by a ramp to the braze temperature of about 1840° C. with a hold at that temperature of approximately five minutes to allow the platinum to melt and flow. The furnace temperature is then allowed to cool in vacuum back down to approximately 450° C. At 450° C., the furnace is filled with nitrogen gas to force a rapid cooling to about 100° C. At that point the furnace is opened to allow removal of the bonded anode target structures.

Pull tests were conducted on sample brazed composites in which tungsten and nickel were employed with the platinum. These tests were conducted at room temperature and resulted in a pull strength of 2600 psi for a 0.6 micron tungsten coated bonding layer and 2000 psi for a 4 micron nickel coated brazed bonding layer. In this instance the amount of tungsten was 0.8 weight % in the platinum and the nickel was 2.5 weight %. It should be pointed out that the tungsten in particular increases the creep strength of the platinum which is especially important when the TZM metal element has a lateral flange portion 25 extending over a lateral edge portion of the graphite disc portion 14. This allows the bonding material to flow into the area designed at 26.

Further testing of a platinum-tungsten brazed joint at a temperature of 1250°-1260° C. was performed with 100,000 scans without delamination in the brazed joint. In comparison, tubes with a platinum-tantalum brazed joint showed gradual joint delamination, beginning at around 30,000 scans, under the same protocol. The joint delamination starts from the outside circumference of the braze joint and proceeds inwards. Yielding of the braze material is due to the warpage stress created by differential thermal expansion of the tungsten-rhenium track and the TZM substrate.

Another tube using the platinum-tungsten brazed joint, after going through 40,000 scans, three 1350° C./8HR and one 1400° C./8HR furnace thermal cycles, began to show degradation of the joint as detected by ultrasound scanning. Tubes using the platinum-tantalum bonding layer usually reveal significant delamination in the joint after three 8 hour cycles at 1350° C. without any scan life accumulated prior to the test.

Higher temperature testing was also conducted with a tube having the bonding layer of this invention. It was heated up to 50° C. higher in the joint than the current test procedure, adding two more scans in sequence. The test was stopped after 50,000 scans intentionally to examine the tube. During the operation, no high voltage overloads were observed.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

We claim:

1. In a composite structure wherein a refractory metal portion is bonded to a graphite portion with a bonding layer the improvement wherein:

the bonding layer comprises platinum and a bonding agent selected from the group consisting of tungsten, nickel, molybdenum, vanadium, and titanium.

2. A composite x-ray tube target comprising:

a refractory metal portion having a focal track applied to a forward face for producing x-rays;

a graphite substrate portion; and a bonding layer joining said graphite substrate portion to said refractory metal portion, said bonding layer comprising platinum and an additional bonding material selected from the group consisting of tungsten, nickel, molybdenum, vanadium, and titanium.

3. The composite x-ray tube target of claim 2 wherein said alloying material is tungsten, and is present in an amount of at least 0.8 weight % based on said platinum.

4. The composite x-ray tube target of claim 3 wherein said bonding layer has a room temperature pull strength of at least 2600 psi.

5. The composite x-ray tube target of claim 2 wherein said alloying material is nickel and is present in an amount of at least 2.5 weight % based on said platinum.

6. The composite x-ray tube target of claim 5 wherein said bonding layer has a room temperature pull strength of at least 2000 psi.

7. A method of producing an x-ray tube target composed of a refractory metal portion having a focal track thereon and a graphite substrate portion comprising:

applying platinum and a bonding material between said refractory metal portion and said graphite substrate portion and;

brazing said platinum and bonding material to form a bonding layer to bond said refractory metal portion to said graphite substrate portion.

8. The method of producing an x-ray tube target as defined in claim 7 wherein said bonding material is selected from the group consisting of tungsten, nickel, molybdenum, vanadium, and titanium.

9. The method of producing an x-ray tube target as defined in claim 7 wherein said bonding material is tungsten and said brazing is effected at a temperature of approximately 1840° C. whereby a thermally stable x-ray tube target is produced.

10. The composite x-ray tube target of claim 1 having a thermal stability at 1350° C.

* * * * *